(12) United States Patent
Nation et al.

(10) Patent No.: US 11,294,831 B2
(45) Date of Patent: *Apr. 5, 2022

(54) OPTIMIZING TIME-DEPENDENT SIMULATIONS OF QUANTUM COMPUTING ARCHITECTURES

(71) Applicant: International Business Machines Corporation, Armonk, NY (US)

(72) Inventors: Paul Nation, Yorktown Heights, NY (US); Naoki Kanazawa, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,466

(22) Filed: Dec. 21, 2020

(65) Prior Publication Data

US 2021/0109871 A1    Apr. 15, 2021

Related U.S. Application Data

(63) Continuation of application No. 16/513,215, filed on Jul. 16, 2019, now Pat. No. 10,970,234.

(51) Int. Cl.
*G06F 13/16* (2006.01)
*G06N 10/00* (2022.01)
*G06F 17/13* (2006.01)
*G06F 17/11* (2006.01)

(52) U.S. Cl.
CPC ............ *G06F 13/161* (2013.01); *G06F 17/13* (2013.01); *G06N 10/00* (2019.01)

(58) Field of Classification Search
CPC ........ G06F 13/161; G06F 17/13; G06F 17/11; G06N 10/00
USPC .............. 710/16, 20, 30, 33, 62, 65, 68, 105
See application file for complete search history.

(56) References Cited

U.S. PATENT DOCUMENTS

| | | | |
|---|---|---|---|
| 10,469,087 B1* | 11/2019 | Granade | ................ G06N 7/005 |
| 2006/0113994 A1* | 6/2006 | Epstein | ................ G01R 33/446 |
| | | | 324/300 |
| 2015/0324705 A1* | 11/2015 | Biercuk | ................ G06F 3/0673 |
| | | | 711/101 |
| 2018/0218279 A1* | 8/2018 | Lechner | ................ G06N 10/00 |
| 2019/0179730 A1* | 6/2019 | Geller | ................ G06F 11/3648 |

OTHER PUBLICATIONS

List of all IBM related dockets, 2020.

* cited by examiner

*Primary Examiner* — Idriss N Alrobaye
*Assistant Examiner* — Henry W Yu
(74) *Attorney, Agent, or Firm* — Garg Law Firm, PLLC; Rakesh Garg; Joseph Petrokaitis

(57) ABSTRACT

A method is performed to compile input data including a plurality of pulse sequences, hardware parameters obtained from a computing device, and a mathematical model with time-dependent control parameters to decrease a computation time of the input data. The method also includes providing the input data to the computing device to allow the computing device to run a computation of the input data. The method further includes converting the pulse sequences into memory-aligned arrays to decrease the computation time of the input data. The method includes calculating optimized output data using an adaptive step size computation to decrease the computation time needed to compute the output data.

20 Claims, 8 Drawing Sheets

OPTIMIZING TIME-DEPENDENT SIMULATIONS OF QUANTUM COMPUTING ARCHITECTURES

TECHNICAL FIELD

The present invention relates generally to minimizing the simulation time of quantum computing architectures in a quantum computing device. More particularly, the present invention relates to using time-dependent control parameters in the quantum computing architectures to minimize its computation or simulation time in a quantum computing and/or classical computing device.

BACKGROUND

It is often of interest to simulate the time dynamics of quantum computing systems under the influence of time-dependent control parameters and uncontrolled environmental noise. The memory and time requirements of such simulations can grow exponentially. The time requirements of the simulations can be offset by expressing the system in terms of sparse matrices. Less information is discussed in relation to optimizing the inputs and minimizing the simulation or computation time in the quantum computing systems. In particular, less information is currently available on optimizing the time-dependent coefficients that are part of the input data.

An adaptive step size differential equation can be beneficial to minimizing the runtime of a simulation in a quantum computing device. However, incorrect results for the input data can occur for systems where large portions of the evolution do not change the state of the system. More specifically, large portions of the input data do not cause the simulation time to be decreased, and often lengthen the simulation. Further, a control pulse that is later applied during the simulation often does not decrease the simulation time due to the large amounts of input data currently running within the quantum computing system.

Accordingly, given the large portions of input data running on a quantum computing device, a need exits to minimize the run time or simulation of this input data, and to deliver output data in a time efficient manner. An adaptive step size differential equation that calculates a minimum step size of the input data cannot always effectively minimize the run time or computation time of the input data.

The illustrative embodiments recognize that input data that consists of pulse sequences that are compatible with the hardware parameters of the quantum computing device can help to minimize the simulation of the input data during a simulation. A user can query the quantum computing device to determine the hardware parameters of the quantum computing device. The quantum device can transmit to the user a list of its hardware parameters. The user can then determine if the current pulse sequence that the user has generated is compatible with the hardware parameters of the quantum computing device. The quantum computing device can also send to the user a pulse sequence library so the user can see the pulse sequence that can successfully run on the quantum computing device. The user can then incorporate the pulse sequences that can successfully run on the quantum computing device with the list of hardware parameters in the input data.

The illustrative embodiments also recognize that time-dependent control parameters can be incorporated into the input data to minimize the simulation time accordingly. The input data can include a mathematical model of the quantum computing device. The mathematical model can be a Hamiltonian of the quantum computing device. The Hamiltonian can initially be expressed as a string function. Before being inputted onto the quantum computing device, the Hamiltonian can be expressed as a sparse matrix with time-dependent control parameters. The Hamiltonian expressed as a sparse matrix with the time-dependent control parameters can be part of the input data that is inputted into the quantum computing device.

The illustrative embodiments recognize that input data with pulse sequences compatible with the hardware parameters quantum computing device, hardware parameters of the quantum computing device, and a mathematical model of the quantum computing device with time-dependent control parameters can reduce the simulation time on a quantum computing device. The input data consisting of the pulse sequences, the list of hardware parameters of the quantum computing device, and the mathematical model (Hamiltonian) can be inputted onto the quantum computing device to run a computation or simulation of the input data. The quantum computing device can convert the pulse sequences into memory-aligned arrays to allow for more efficient computation, wherein the simulation time of the input data can be reduced. An adaptive step size differential equation can be used to determine a minimum step size of the smallest pulse sequence among the plurality of pulse sequences.

The illustrative embodiments recognize the quantum computing device can compute various calculations of the input data. The quantum computing device can pause the simulation to compute external conditions which are affecting the computation of the input data. The external conditions can include noise properties of the quantum computing device which are being applied to the input channels. The inputted data are input through the input channels. The input channels can include drive (d), measure (m), and control (u) channels. The external conditions can also include additional input data (pulse sequence, further hardware parameters, and additional variables for the Hamiltonian). The quantum computing device can compute measurements of the input data. The measurements can include state vector snapshots, or the positions of the input data at one or more time intervals during the simulation. The measurements can also include expectation values for the input data.

The illustrative embodiments depict determining a minimum step size allowed for the input data using an adaptive step size differential equation. The minimum step size allowed can be a fraction of the smallest pulse sequence of the pulse sequences included in the input data.

The illustrative embodiments also recognize that the quantum computing device can execute a program of routines during a code generation step to determine any additional changes occurring to the input channels during the simulation. During the program routines, the quantum computing device writes a program of routines that compute the values of all of the input channels of the quantum computing device at one or more time intervals. The quantum computing device also includes any external conditions and frame changes that are applied to the input channels in computing the values of the input channels at one or more time intervals. The quantum computing device can also compute the numerical values of all of the variables of the Hamiltonian or mathematical model included in the input data. The variables of the Hamiltonian can include the time-dependent control parameters that assist in optimizing the simulation time in the quantum computing device.

In illustrative embodiments, the quantum computing device can accordingly produce output data while optimizing the simulation time of the input data. The simulation time of the quantum computing device is minimized by using the time-dependent control parameters in the Hamiltonian, the pulse sequence in conjunction with the hardware parameters of the quantum computing device, and the adaptive step size differential equation.

In illustrative embodiments, the process for the quantum computing device can also be implemented on a classical computer or classical computing device. The input data with the pulse sequence and Hamiltonian with time-dependent control variables can also minimize the simulation time of the input data in a classical computing device.

The illustrative embodiments provide input data with time-dependent control variables into a computing device, with calculations of the input data being performed to minimize the computation time of the input data within the computing device. The illustrative embodiments also provide a computer program product and a computer system to minimize the computation time of the input data.

SUMMARY

The illustrative embodiments provide a method, computer program product and computer system for optimizing input data with time-dependent control parameters in a computing device. An embodiment compiles input data comprising a plurality of pulse sequences, hardware parameters obtained from a computing device, and a mathematical model with time-dependent control parameters to decrease a computation time of the input data. The embodiment provides the input data to the computing device to allow the computing device to run a computation of the input data. The embodiment converts the pulse sequences into memory-aligned arrays to decrease the computation time of the input data. The embodiment calculates optimized output data using an adaptive step size computation to decrease the computation time needed to compute the output data.

In an embodiment, the method includes computing a minimum step size allowed in the adaptive step size computation. The method includes obtaining the minimum step size allowed during the adaptive size computation.

In an embodiment, the method includes computing the minimum step size to be a fraction of a smallest pulse sequence among of the plurality of pulse sequences. In an embodiment, the computing device computes the minimum step size to be a fraction of a smallest pulse sequence that is among the plurality of pulse sequences.

In an embodiment, the method includes computing time intervals at which to pause the computation of the input data to determine one or more external conditions affecting the computation of the input data. In an embodiment, the computation is paused at various time intervals to determine one or more conditions affecting the simulation of the input data.

In an embodiment, the method includes writing a program consisting of routines computing values of all input channels on the computing device at a specific time interval. In an embodiment, the values of the input channels are determined at a specific time interval.

In an embodiment, the method includes writing a program of routines that determines changes applied to the input channels of the computing device at one or more time intervals. In an embodiment, the changes to the input channels are determined at one or more time intervals.

In an embodiment, the method includes querying the computing device to determine which of the plurality of pulse sequences can be inputted into the computing device. In an embodiment, the compatibility of the computing device with the pulse sequences is determined.

In an embodiment, the method includes receiving the one or more the pulse sequences from the computing device in response to querying the computing device to determine which of the pulse sequences can be inputted into the computing device. In an embodiment, the computing device provides pulse sequences to be inputted as input data in response to the query.

In an embodiment, the method includes determining noise properties of the computing device to be placed into the input data. In an embodiment, the noise properties of the computing device are included in the input data.

In an embodiment, the method includes selecting additional pulse sequences in response to receiving the hardware parameters from the computing device. In an embodiment, the user generates additional pulse sequences after receiving the list of hardware parameters from the computing device.

In an embodiment, the method includes selecting the additional pulse sequences to be compatible with the hardware parameters of the computing device. In an embodiment, the user generates additional pulse sequences to be compatible with the hardware parameters of the computing device.

In an embodiment, the method includes pausing the computation to compute one or more expectation values for the input data. In an embodiment, the computing device pauses the computation and computes one or more expectation values for the input data.

In an embodiment, the method includes calculating a minimum step size to be a width of a smallest pulse sequence among the plurality of pulse sequences. In an embodiment, the computing device computes a minimum step size of a width of the smallest pulse sequence using an adaptive step size differential equation.

In an embodiment, the method includes pausing the computation to determine one or more positions of the input data at one or more time intervals. In an embodiment, the computing device pauses the computation to determine one or more positions of the input data.

In an embodiment, the method includes calculating a position of the input data at a specific time interval during the computation of the input data. In an embodiment, the computing device calculates a position of the input data at a specific time interval.

In an embodiment, the method includes calculating numerical values for one or more variables in the mathematical model. In embodiment, the computing device calculates the numerical values for the variables used in the Hamiltonian.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
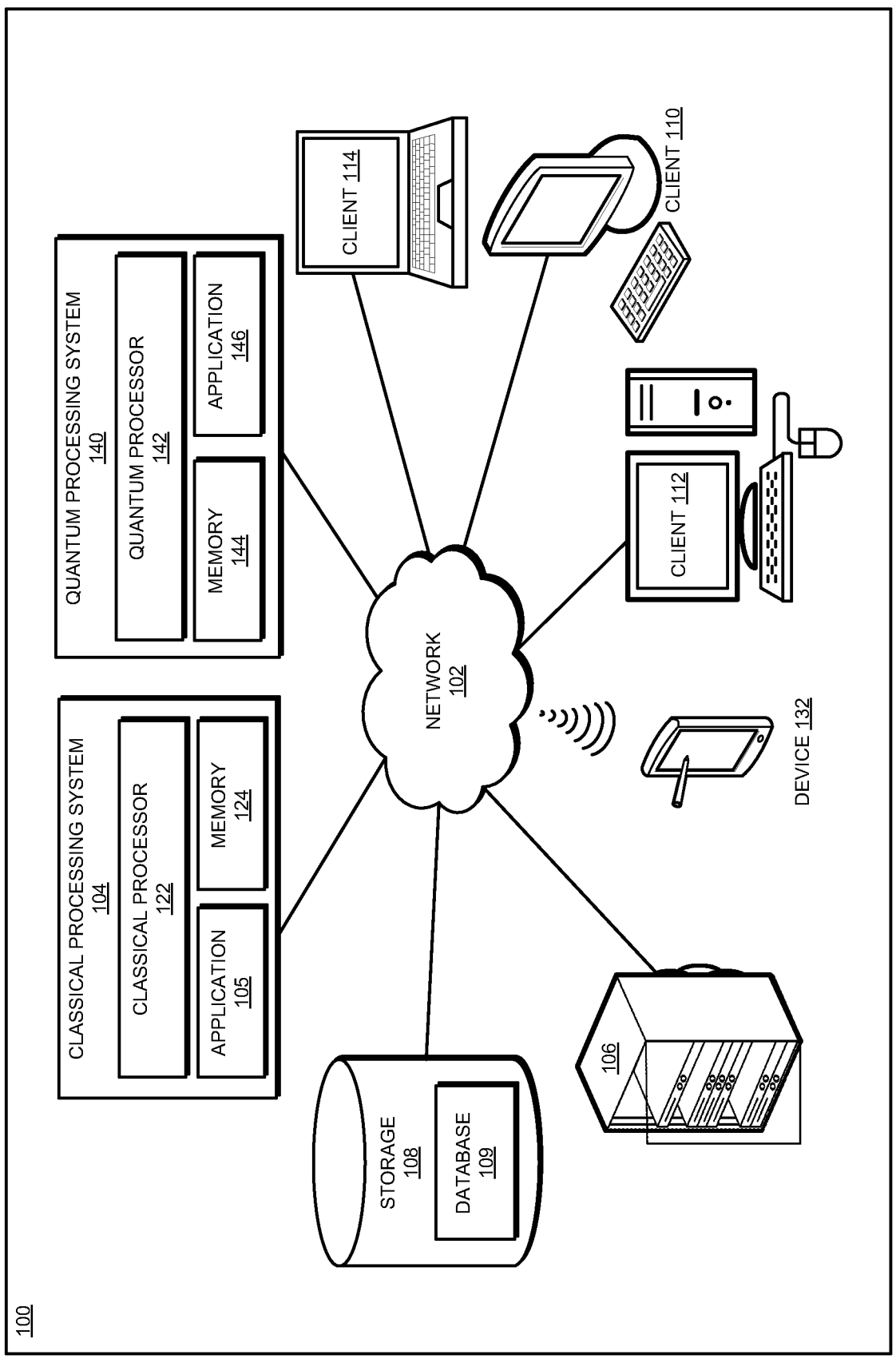
FIG. 1 depicts a block diagram of a network of data processing systems in which illustrative embodiments may be implemented.

The illustrative embodiments used to describe the invention generally address and solve the above-described problem of optimizing simulation of the input data for a quantum computing architecture to allow the simulation to occur in minimal run time or simulation time and to be usable in a variety of compiled languages (python, c, c++, etc.) within a data processing system. The illustrative embodiments provide a method, computer program product and computer system for optimizing the simulation of input data for a quantum computing architecture.

An embodiment provides a method for optimizing the simulation of input data of a quantum computing architecture by inputting the input data including pulse sequences, hardware parameters and a mathematical model or Hamiltonian include time-dependent control parameters into a computing device. The embodiment includes using the pulse sequences and time-dependent control parameters during the simulation of the input data with an adaptive step size computation to minimize the simulation time of the input data. Another embodiment provides a computer usable program product with program instructions for inputting the input data with the pulse sequences, hardware parameters and Hamiltonian into a computing device, and then using the input data with an adaptive step size computation to further minimize the simulation time of the input data. Still another illustrative embodiment provides a computer system with program instructions for inputting the input data with pulse sequences, hardware parameters and Hamiltonian into a computing device, and using the input data with an adaptive step size computation to further minimize the simulation time of the input data. The instructions are executable using a conventional or quantum processor.

An embodiment illustrates a pulse sequence that a user can input into a quantum or classical computing device. The pulse sequence is run on input channels drive (d), measure (m) and control (u). The input channels are the channels on the classical or quantum computing device on which the pulse sequences are inputted. In illustrative embodiments, the pulse sequences are inputted on the drive channel (d). In other illustrative embodiments, the pulse sequences are inputted on the measure (m) channel. Still in other illustrative embodiments, the pulse sequences are inputted on the control (u) channel, etc.

In an embodiment, a user queries a quantum computing device (quantum device) to determine what pulse sequences are compatible within the quantum device. A user generates a series of pulse sequences to be inputted onto the quantum device. The user queries the quantum device to determine if the generated pulse sequences are compatible with the quantum device and can successfully run on the quantum device. The quantum device responds to the query and sends the user a list of the hardware parameters of the quantum device. The hardware parameters indicate to the user which pulse sequences can successfully run on the quantum computing device. The user can decide to generate additional pulse sequences or keep the current pulse sequences. The user can also decide to generate new pulse sequences and keep the original pulse sequences as input data. The quantum device also sends the user a stored pulse library. The pulse library indicates the pulse sequences stored within the quantum device. The pulse library also indicates the pulse sequence that can be successfully run on the quantum device. The user can use generate the same or substantially similar pulse sequences to the pulse sequence library. The user can also input the original pulse sequences as input data. Still in other illustrative embodiments, the user can query a classical computing device to determine whether the pulse sequences can be input successfully onto the classical computing device.

In an illustrative embodiment, a mathematical or numerical model for the Hamiltonian for the quantum device or classical computing device is depicted. The user generates the Hamiltonian or a mathematical model with time-dependent control parameters to minimize the computation time on the quantum device. The Hamilton is shown as a string function of time-dependent data. The Hamiltonian is then placed as a sparse matrix with time-dependent control parameters to enable the time-dependent control parameters to be multiplied during the computation or simulation of the input data on the quantum device to minimize the computation time. In other illustrative embodiments, the noise properties of the quantum computing device or classical computing device are also part of the Hamiltonian. The noise properties affect the simulation time of the Hamiltonian within either the quantum device or the classical computing device. Inputting the sparse matrix with the time-dependent control parameters along with the pulse sequences can further minimize the computation time of the input data.

In an illustrative embodiment, a user runs a simulation of the input data on quantum device. Still in other illustrative embodiments, the user can run the simulation of the input data on a classical computing device (classical device). The user inputs the input data consisting of the pulse sequences, list of hardware components (received from the quantum computing device during the user query), and the mathematical model or Hamiltonian of the quantum device including the time-dependent control parameters. The quantum device can parse the input data. The quantum device can also convert the pulse sequence information into memory-aligned arrays, which thereby allow for more efficient computation. The more efficient computation will allow for a more optimized simulation in which the computation time is reduced. The quantum device can also pause the simulations to compute measurements of the input data. The measurements of the input data include the state vector or position of the input data at various time intervals during the simulation. The quantum device can also calculate expectation values for the input data during the simulation at one or more time intervals. In other illustrative embodiments, to optimize the simulation time, the quantum device can also make these aforementioned calculations without pausing the simulation.

Still with respect to the illustrative embodiment, the quantum device computes a minimum step size for the input data in an adaptive step size differential equation. The adaptive step size differential equation can be used to minimize the computation time of the input data by using a step size depending on a size or width of one or more of the pulse sequences. The step size can be a fraction of the smallest pulse sequence. In some illustrative embodiments, the minimum step size is a fraction of the width of the smallest pulse sequence. Still in other illustrative embodiments, the minimum step size can be greater or less than the fraction of the width of the smallest pulse sequence.

With reference to the illustrative embodiment, the quantum device can perform a code generation step. The quantum device writes a program with a series of routines that compute the values of all of the input channels that are acting on the quantum device at a given time. The quantum device takes into account any external or internal conditions and frame changes of the input data that are applied to the input channels. During the code generation, the quantum device calculates the numerical coefficients of the mathematical model or Hamiltonian of the quantum device. The coefficients of the Hamiltonian include the time-dependent control parameters. The quantum device can also calculate the positioning or vector at one or more time intervals by performing a matrix-vector multiplication for each of the terms in the sparse matrix (refer to FIG. 5). The matrix-vector multiplication for each term will further optimize the computation time. In other illustrative embodiments, the noise of the quantum device can be included during the code generation phase. The quantum device can compute the optimized output using the adaptive step size differential equation. The output is optimized with the computation time of the input data being minimized.

In an illustrative embodiment, the user can perform the same simulation of the input data on a classical computing device (classical device). Generating the input data that includes the time-dependent control parameters of the Hamiltonian, along with the adaptive step size differential equation, and the multiplying of the time-dependent control parameters during the code generation step can minimize the simulation time as with the quantum device. The classical device can similarly compute an optimized output data using the input and steps described above with the quantum device.

Accordingly, one or more embodiments provide for a method, computer program and computer system that optimizes the simulation time of input data including time-dependent control parameters. Various embodiments including the time-dependent control parameters in conjunction with an adaptive step size differential equation enable simulation of the input data within a computing device to be minimized accordingly.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for automatic quantum searching of object databases using a variety of components that can be purposed or repurposed to provide a described function within a data processing environment, and such adaptations are contemplated within the scope of the illustrative embodiments.

The illustrative embodiments are described with respect to certain types of steps, applications, quantum logic gates, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
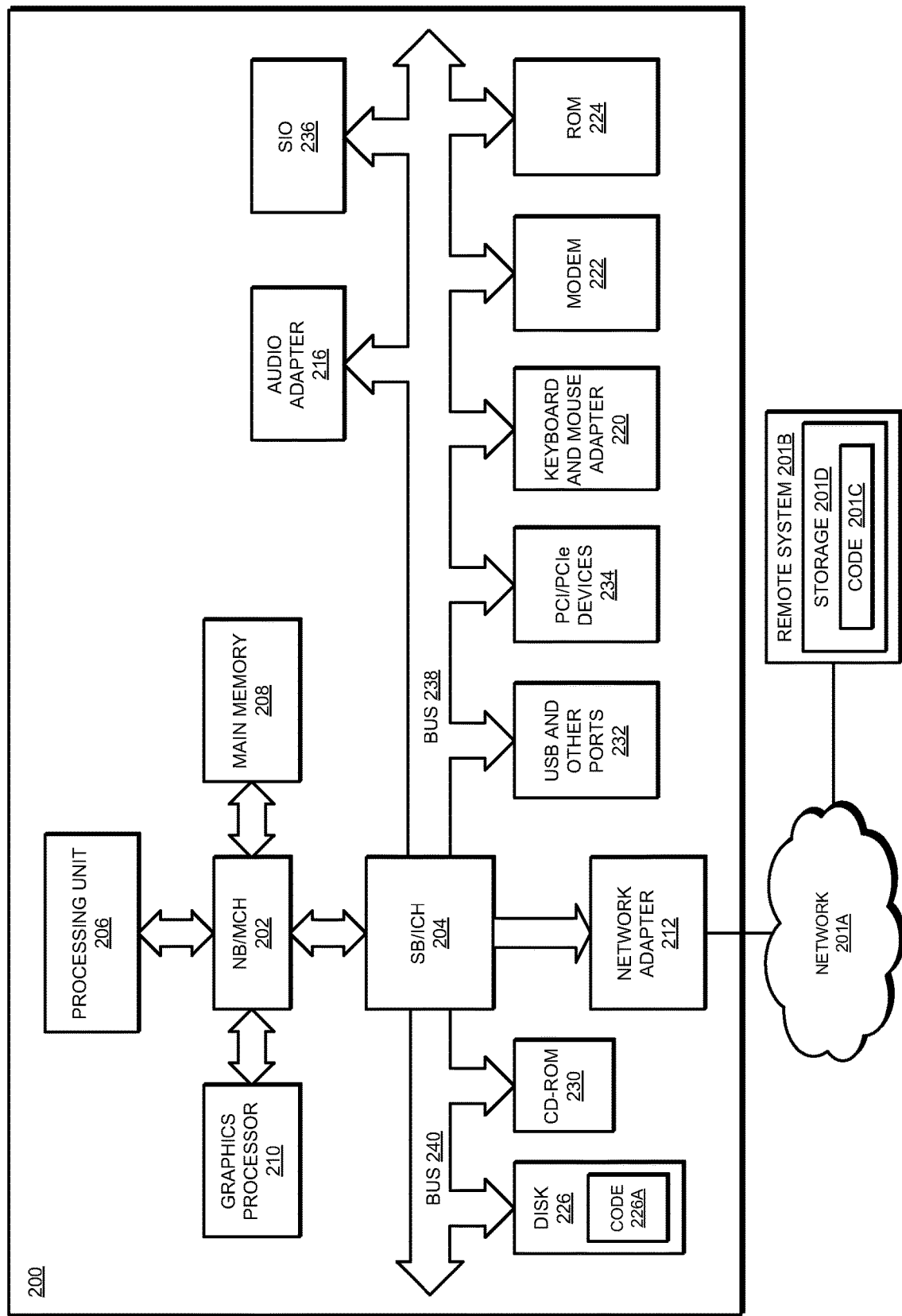
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any quantum data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Storage unit 108 includes a database 109 configured to store neural network training data as described herein with respect to various embodiments. Server 106 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to classical processor 122. Classical processor 122 may include its own data, boot files, operating system images, and applications. Data processing environment 100 may include additional memories, quantum processors, and other devices that are not shown. Memory 124 includes application 105 that may be configured to implement one or more of the classical processor functions described herein for correcting bias on a hybrid classical-quantum computing system in accordance with one or more embodiments.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 146 that may be configured to implement one or more of the quantum processor functions described herein in accordance with one or more embodiments.

The data processing environment 100 may include additional memories, quantum processors, and other devices that are not shown. In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, the data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as classical processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system. The main memory 208 is manifested as a virtualized instance of all or some portion of main memory 208 that may be available in the host data processing system. The disk 226 is manifested as a virtualized instance of all or some portion of disk 226 that may be available in the host data processing system. The host data processing system in such cases is represented by data processing system 200.

Figure 3:
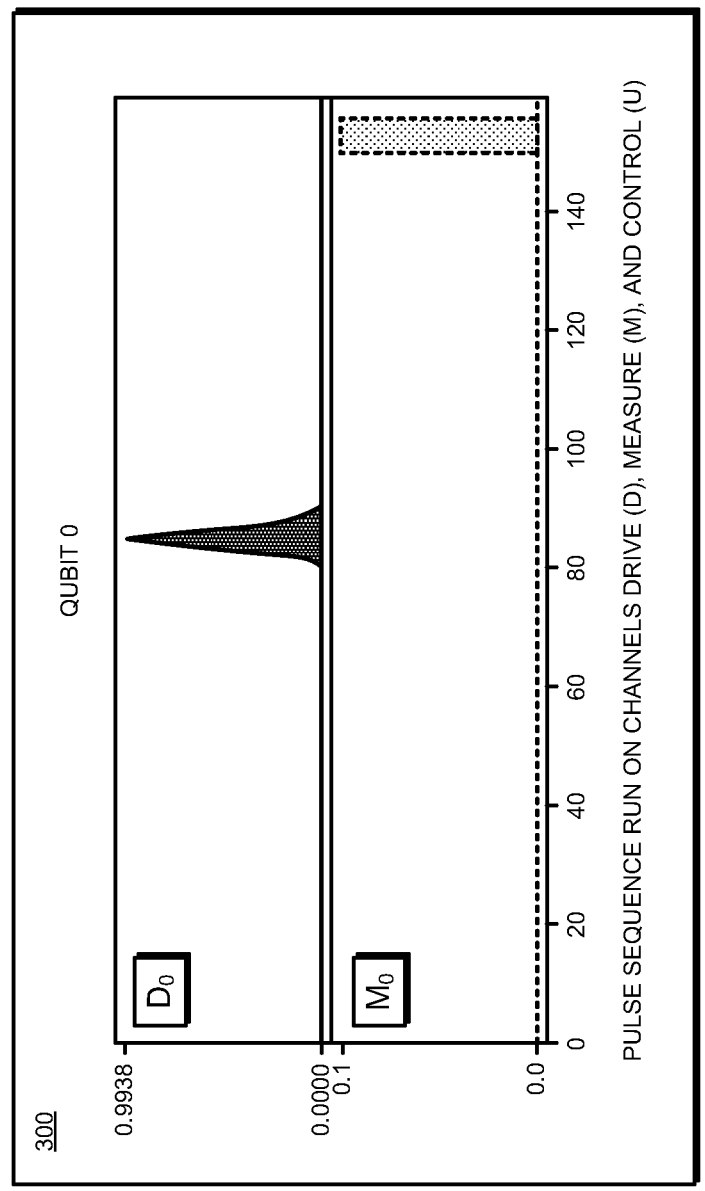
FIG. 3 depicts a pulse sequence graph in accordance with an illustrative embodiment.

With reference to FIG. 3, this figure depicts a diagram of a pulse sequence 300 in accordance with an illustrative embodiment. The pulse sequence 300 can typically run on input channels label drive (d) and/or measure (m). In other illustrative embodiments, the pulses can run on input channels such as control (u). Further, the pulse sequence 300 can be lists such as [a0, b0], [a1, b1] . . . ], where a0 and b0 are the real and imaginary parts of a complex number. Still in other illustrative embodiments, the pulse sequence 300 can run on other input channels in addition to the drive (d), measure (m) and control (u) channels.

Figure 4:
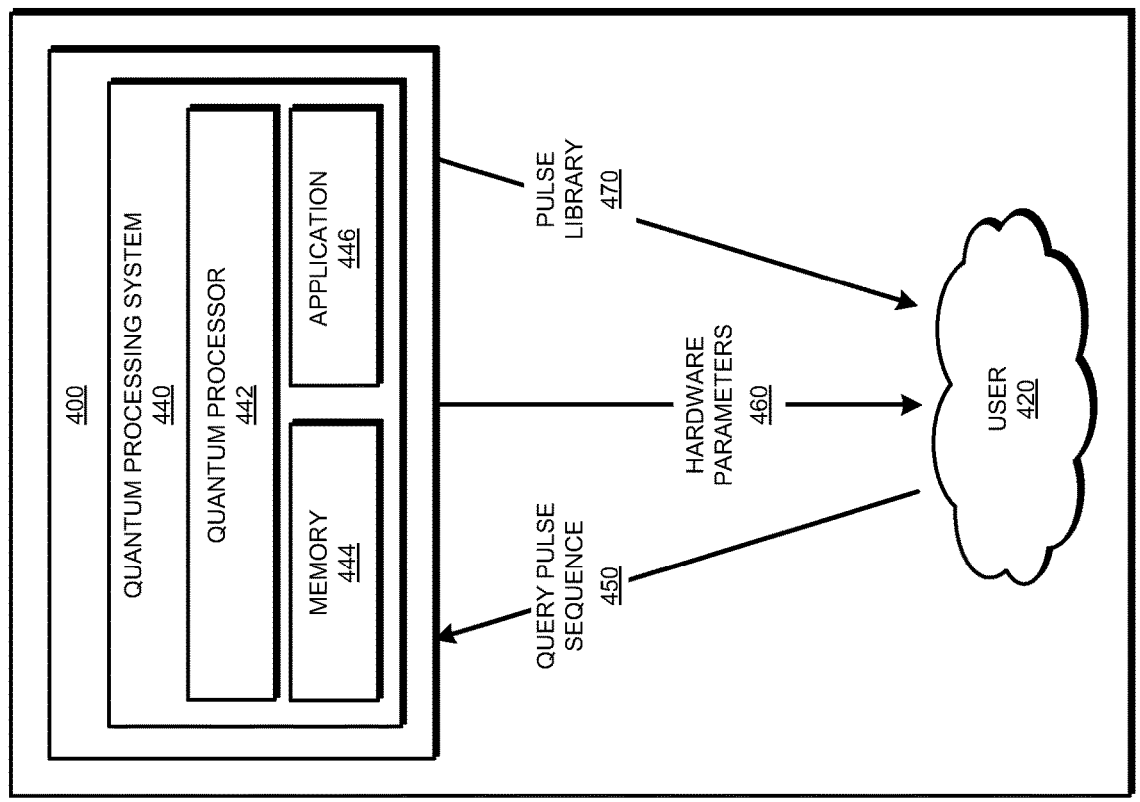
FIG. 4 depicts a block diagram of a quantum computing device in accordance with an illustrative embodiment.

With reference to FIG. 4, a figure of a quantum device 400 is depicted in an illustrative embodiment. The quantum device includes a quantum processing system 440, quantum processor 442, memory 444 and application 446. A user 420 can use a generated pulse sequence 450 as input data to input onto the quantum device 400. However, the user 420 should know if the pulse sequence 450 is compatible with the quantum device 400 given its hardware parameters, and whether it can be inputted onto the quantum device 400. As a result, the user 420 will query the quantum device 400 to determine if the generated pulse sequence 450 can be inputted onto the quantum device 400. The quantum device 400 will send the user 420 its list of hardware parameters 460 to indicate to the user what pulse sequences can run on the quantum device 400. The quantum device 400 shares with the user 420 its hardware parameters 460, and also a stored pulse sequence library 470. The pulse sequence library 470 indicates what type of pulses can be successfully run on the quantum device 400. The user 420 can input the pulse sequence 450 and the received hardware parameters 460 as part of the input data onto the quantum device 400. Still in other illustrative embodiments, the user 420 can generate a new pulse sequence after observing the pulse sequence library 470 from the quantum device, and input the new pulse sequence as input data onto the quantum device 400. Still in other embodiments, the user 420 can generate a new pulse sequence and use the new pulse sequence in addition to the original pulse sequence 450 as input data.

Figure 5:
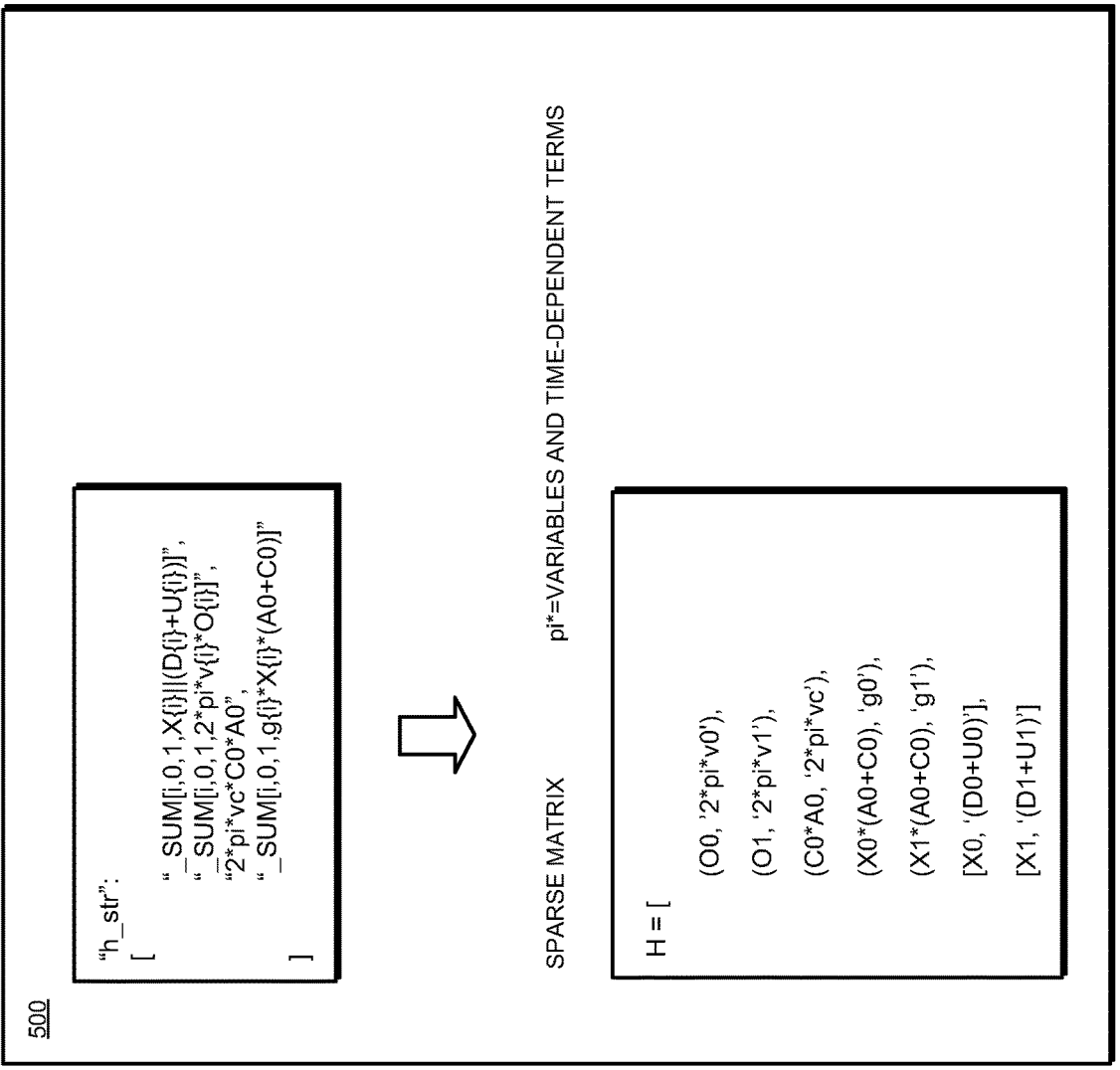
FIG. 5 depicts a mathematical model in accordance with an illustrative embodiment.

With reference to FIG. 5, a numerical or mathematical model 500 of the quantum device 400 in an illustrative embodiment is depicted. The numerical model 500 can originally be in a data string format (h_str). From the data string format, the numerical model 500 can eventually be placed into a sparse matrix format. The sparse matrix can include variables and time-dependent control parameters. The time-dependent control parameters can help minimize the computation time when the Hamiltonian is inputted and run on the quantum device 400. Together with the pulse sequence 450 and hardware parameters 460, the numerical model 500 can be inputted onto the quantum device 400.

Figure 6:
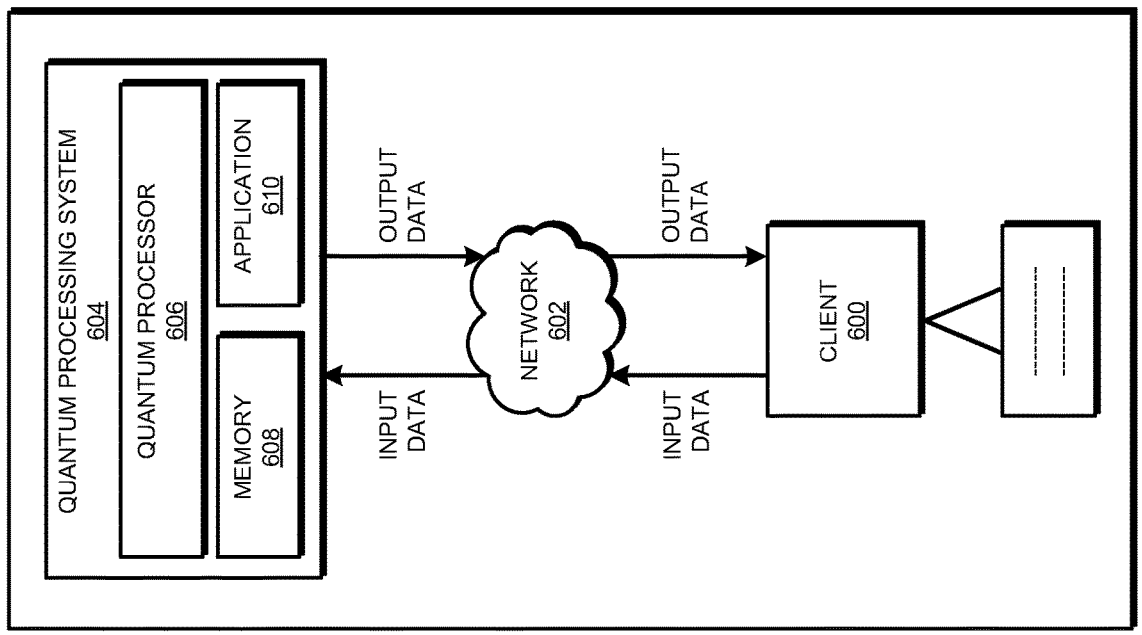
FIG. 6 depicts a block diagram of a quantum computing device system in accordance with an illustrative embodiment.

With respect to FIG. 6, a diagram of the method implemented on a quantum device in an illustrative embodiment is depicted. The user can compile input data by the methods described above in FIGS. 3-5. The user can compile the input data consisting of pulse sequences, the hardware parameters of a quantum device, and a mathematical model that includes time dependent control parameters to reduce a computation time of the input data. The user can utilize a client device 600. The client device can be coupled to a network 602. The network 602 can be coupled to a quantum processing system 604. The quantum processing system 604 includes a quantum processor 606, memory 608 and application 610. The user inputs the input data onto the client device 600. The client device sends the input data through the network 602. The network 602 sends the input data to the quantum processing system 604.

Still with reference to FIG. 6, the quantum processing system 604 parses the input data. The quantum processor 606 also converts the pulse sequence information from the input data into memory-aligned arrays. The memory-aligned arrays can ensure more efficient computation of the input data in which the computation time of the input data is minimized accordingly. The hardware parameters of the quantum processing system 604 are part of the input data. The quantum processing system 604 provides the hardware parameters to the user in response to the user querying the quantum processing system 604 for its hardware parameters as described in FIG. 4. The mathematical model includes the Hamiltonian described in FIG. 5, which is represented in a sparse matrix with time-dependent control parameters to minimize the computation time of the input data.

With respect to FIG. 6, the quantum processor 606 has parsed the input data and the simulation or computation of the input data can begin. The quantum processor 606 computes various times at which to pause the simulation, and compute conditional evaluations. Conditional evaluations include noise properties of the quantum processing system 604 that are affecting the simulation. The noise properties can also affect the input channels on the quantum processing system 604. The quantum processor 606 can also pause the simulation and compute measurements of the input data. The measurements can include state vector snapshots, or the positions of the input data at a particular time or time intervals during the simulation. The measurements can also include expectation values for the input data after at certain time intervals during the simulation or after the simulation is complete. Still in other illustrative embodiments, the quantum processor 606 can pause the simulation to conduct other measurements and determine other conditions affecting the simulation at various time intervals.

With respect to FIG. 6, a minimum step size of the input data is calculated at various time intervals. The quantum processor 606 computes a minimum step size for the input data in an adaptive step size differential equation to further minimize the computation time of the input data. The minimum step size is a fraction of the width of the smallest pulse sequence of the input data. Still in other illustrative embodiments, the minimum step size can be a different fraction of the smallest pulse sequence. The adaptive step size differential equation computes values of the input data at different time intervals throughout the simulation. Still in other illustrative embodiments, the adaptive size differential equation calculates the minimum step size at certain time intervals, or at a single time interval.

Still with reference to FIG. 6, the quantum processor 606 performs a code generation step at one or more time intervals during the simulation. During the code generation step, the quantum processor 606 writes a program of routines that compute the values of all of the input channels acting on the quantum processing system 604 at one or more time intervals. The quantum processor 606 includes any external conditions and frame changes that are applied to the input channels. The quantum processor 606 computes the numerical values of all of the coefficients of the Hamiltonian or mathematical model included in the input data, with the coefficients including the time-dependent control parameters that minimize the computation time of the input data. The quantum processor 606 can compute a state vector or position of the input data at a time "t." The quantum processor 606 can also compute state vectors of the input data at various time intervals throughout the simulation. The quantum processor 606 performs matrix-vector multiplication for each of the terms in the sparse matrix of the Hamiltonian. The noise properties of the quantum processing system 604 are included in the quantum processor's 606 calculation of the coefficients of the Hamiltonian. Still in other illustrative embodiments, the quantum processor 606 does not use the noise properties of the quantum processing system while calculating the Hamiltonian coefficients.

With respect to FIG. 6, the quantum processor 606 finishes the simulation and computes the output data, wherein the output data can be optimized due to the computation time being minimized accordingly. The quantum processing system 604 displays the results of the simulation or output data to the client device 602 to allow the user to view the output data. Still in other illustrative embodiments, the user can begin the process of compiling a new set of input data into the quantum processing system 604 to run another simulation on the quantum processing system 604.

Figure 7:
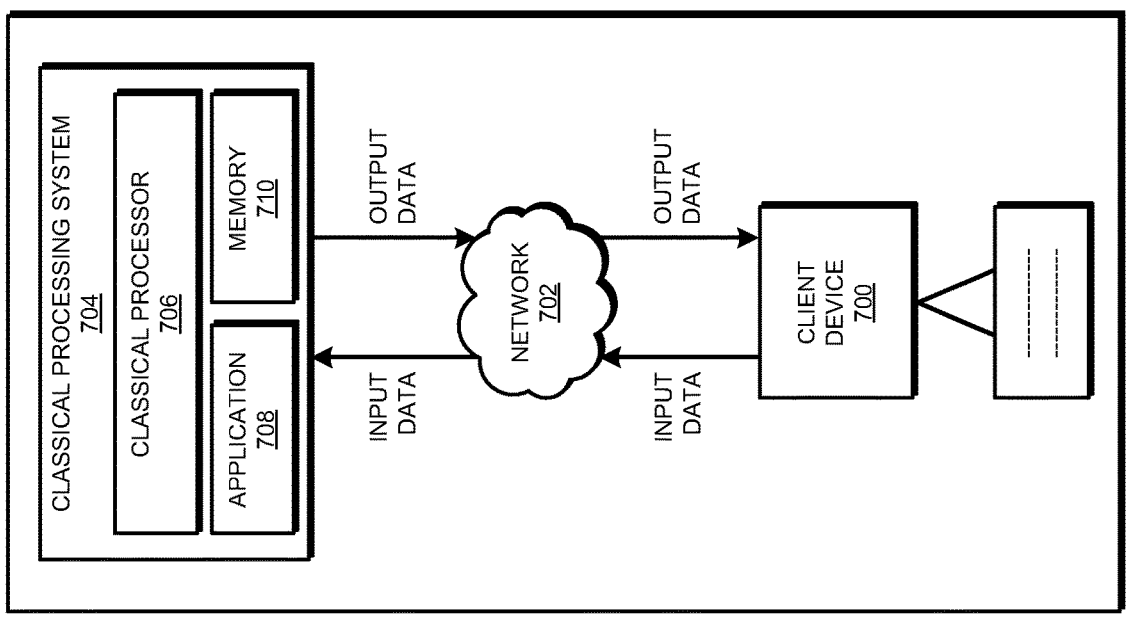
FIG. 7 depicts a block diagram of a classical computing device system in accordance with an illustrative embodiment.

With respect to FIG. 7, another diagram illustrating the simulation method performed on a classical processing system is depicted. The user can perform the simulation of the input data compiled in FIGS. 3-5 on a classical processing system. Similar to the quantum processing system 704, the run time of the simulation performed on a classical processing system can be minimized using the time-dependent control parameters of the Hamiltonian, the pulse sequences, and the hardware parameters and the adaptive step size differential equation. The user inputs the input data onto a client device 700. The client device 700 is coupled to a network 702. The network 702 shares the input data onto the classical processing system 704. The classical processing system 704 includes a classical processor 706, application 708, and memory 710.

Still with reference to FIG. 7, the classical processor 704 parses the input data. The classical processor 706 converts all of the pulse sequence information into memory-aligned arrays to allow for a more efficient simulation of the input data. A more efficient simulation can effectively reduce the run time or computation time of the simulation. The input data also includes the hardware parameters of the classical processing system 704 and the time-dependent control parameters of the mathematical or numerical model (Hamiltonian) that help to minimize the run time of the simulation. As with the quantum processing system 604 in FIG. 6, the classical processing system 704 can provide the user with the hardware parameters in response to a user query with respect to the classical processing system's 704 hardware parameters.

Still with reference to FIG. 7, the classical processor 706 pauses the simulation at one or more time intervals to compute various calculations. The classical processor 706 pauses the simulation to compute any external conditions such as the noise properties of the classical processing system 704 that are affecting the input data. The classical processor 706 can also compute positions of the input data at specific time intervals during the simulation. The classical processor 706 also computes expectation values of the input data at various time intervals throughout the simulation.

With respect to FIG. 7, the classical processor 706 can also compute the minimum step size allowed for the calculation of the input data in an adaptive step size differential equation as the simulation is running. The classical processor 706 can pause the simulation to compute the minimum step size allowed in an adaptive step size differential equation. The classical processor 706 can compute the minimum step size to be a fraction of the width of the smallest pulse sequence. Still in other illustrative embodiments, the minimum step size in the adaptive step size differential equation can be more or less.

With respect to FIG. 7, the classical processor 706 can perform a code generation step. During the code generation step, the classical processor 706 writes a program of routines to perform various calculations. The classical processor 706 calculates the values of the input channels action on the classical processing system 704 at one or more time intervals. The classical processor 706 also computes any frame changes or external conditions that are applied to the input channels that would affect the run time of the simulation. The classical processor 706 also calculates the numeral coefficients for the Hamiltonian shown in FIG. 5. The numerical coefficients of the Hamiltonian include the time-dependent control parameters that can minimize the computation time of the input data. The classical processor 706 also computes the position of the input data at one or more time intervals by performing a matrix-vector multiplication for each term in the sparse matrix of the Hamiltonian shown in FIG. 5. Still in other illustrative embodiments, the noise properties of the classical processing system 704 are used to compute the coefficients of the Hamiltonian and the position of the input data during the simulation.

Still with respect to FIG. 7, the classical processor 706 then obtains optimized output data that is obtained by minimizing the run time needed to compute the simulation of the input data in the classical processing system 704. The classical processing system 704 transfers the output data to the network 702. The network 702 can transfer the output data to the client device 700 for the user to view. Still in other illustrative embodiments, the user can repeat the process and compile another set of input data to input onto the classical processing system 704.

Figure 8:
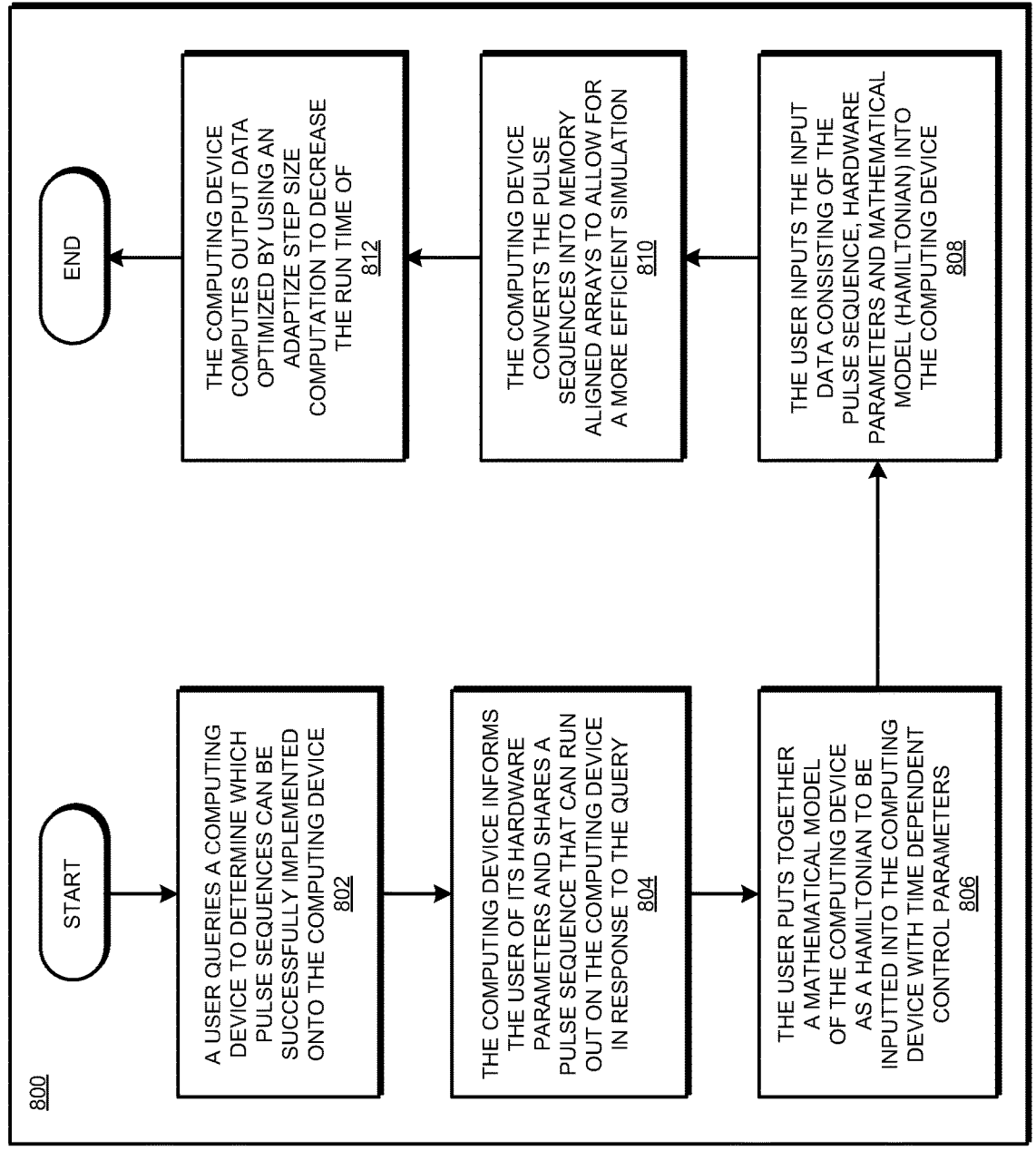
FIG. 8 depicts a flow chart in accordance with an illustrative embodiment.

With reference to FIG. 8, this figure depicts a flowchart of an example process in accordance with an illustrative embodiment. The steps of process 800 are carried out in FIG. 8. The input data can consist of pulse sequences. A user needs to determine if pulse sequences can be inputted onto a computing device (quantum processing system or classical processing system). At block 802, a user queries a computing device to determine which of the pulse sequences can be implemented on its device. At block 804, the computing device informs the user of what pulse sequences can successful run on the device, and also returns to the user the hardware parameters of the computing device. The computing device can also alert the user as to stored pulse sequences on the quantum devices, and what pulse sequences are compatible with the quantum device. At block 806, the user can compile a numerical or mathematical model of the quantum device. The mathematical model is a numerical model for the Hamiltonian of the quantum device as shown in FIG. 5. This mathematical model is expressed in a sparse matrix. The mathematical model includes time-dependent control parameters to enable the input data to be optimized by decreasing the computation time needed to obtain the optimized output data. In other illustrative embodiments, the mathematical model also includes noise properties of the computing device. At block 808, the user can input the input data into the computing device to allow the computing device to run a simulation of the input data. The input data consists of the pulse sequences, the hardware parameters, and the Hamiltonian of the computing device. At block 810, the computing device can parse the input data and convert the pulse sequences into memory-aligned arrays to allow for more efficient computation and decrease the simulation time needed to obtain the optimized output data. At block 812, a desired optimization output data is calculated using an adaptive step size computation which decreases the simulation time needed to compute the output data. During the adaptive step size computation, a minimum step size of the smallest pulse sequence of the plurality of pulse sequences is generated. The minimum step size is calculated to be a fraction of a width of the smallest pulse sequence. Still in other illustrative embodiments, the minimum step size can calculate a different fraction of the smallest pulse sequence to minimize the simulation time of the input data. The process 800 ends thereafter.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented methods are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure.

The present invention may be a method, apparatus and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
compiling input data comprising a plurality of pulse sequences and a hardware parameter obtained from a computing device, wherein the compiling is configured to decrease a computation time of the input data;
providing the input data to the computing device such that the computing device is enabled to run a computation of the input data;
converting the pulse sequences into memory-aligned arrays; and
calculating optimized output data using an adaptive step size computation, the adaptive step computation being configured to decrease the computation time needed to compute the output data.

2. The method of claim 1, further comprising:
computing a minimum step size allowed in the adaptive step size computation.

3. The method of claim 2, further comprising:
computing the minimum step size to be a fraction of a smallest pulse sequence among of the plurality of pulse sequences.

4. The method of claim 1, further comprising:
providing time intervals at which to pause the computation of the input data to determine one or more external conditions affecting the computation of the input data.

5. The method of claim 1, further comprising:
writing a program that comprises routines computing values of all input channels acting on the computing device at a specific time interval.

6. The method of claim 1, further comprising:
writing a program of routines that determines changes applied to input channels of the computing device at one or more time intervals.

7. The method of claim 1, further comprising:
querying the computing device to determine which of the plurality of pulse sequences can be inputted into the computing device.

8. The method of claim 1, further comprising:
receiving the one or more the pulse sequences from the computing device in response to querying the computing device to determine which of the pulse sequences can be inputted into the computing device.

9. The method of claim 1, further comprising:
determining noise properties of the computing device to be placed into the input data.

10. The method of claim 1, further comprising:
selecting additional pulse sequences in response to receiving the hardware parameter from the computing device.

11. The method of claim 10, further comprising:
selecting the additional pulse sequences to be compatible with the hardware parameter of the computing device.

12. The method of claim 1, further comprising:
pausing the computation to compute one or more expectation values for the input data.

13. The method of claim 1, further comprising:
calculating a minimum step size to be a width of a smallest pulse sequence among the plurality of pulse sequences.

14. The method of claim 1, further comprising:
pausing the computation to determine one or more positions of the input data at one or more time intervals.

15. The method of claim 1, further comprising:
calculating a position of the input data at a specific time interval during the computation of the input data.

16. The method of claim 15, further comprising:
calculating numerical values for one or more variables in a mathematical model, the mathematical model being a part of the input data.

17. A computer usable program product comprising one or more computer-readable storage devices, and program instructions stored on at least one of the one or more storage devices, the stored program instructions comprising:
program instructions to compile input data comprising a plurality of pulse sequences and a hardware parameter obtained from a computing device, wherein the compiling is configured to decrease a computation time of the input data;
program instructions to provide the input data to the computing device such that the computing device is enabled to run a computation of the input data;
program instructions to convert the pulse sequences into memory-aligned arrays; and
program instructions to calculate optimized output data using an adaptive step size computation, the adaptive step computation being configured to decrease the computation time needed to compute the output data.

18. The computer usable program product of claim 17, wherein computer usable code is stored in a computer readable storage device in a data processing system, and wherein the computer usable code is transferred over a network from a remote data processing system.

19. The computer usable program product of claim 17, wherein computer usable code is stored in a computer readable storage device in a server data processing system, and wherein the computer usable code is downloaded over a network to a remote data processing system for use in a computer readable storage device associated with remote data processing system.

20. A computer system comprising a processor, a computer-readable memory, and a computer-readable storage device, and program instructions stored on the computer-readable storage device for execution by the processor via the memory, the stored program instructions comprising:
program instructions to compile input data comprising a plurality of pulse sequences and a hardware parameter obtained from a computing device, wherein the compiling is configured to decrease a computation time of the input data;
program instructions to provide the input data to the computing device such that the computing device is enabled to run a computation of the input data;
program instructions to convert the pulse sequences into memory-aligned arrays; and
program instructions to calculate optimized output data using an adaptive step size computation, the adaptive step computation being configured to decrease the computation time needed to compute the output data.

* * * * *